United States Patent [19]

Jourdan

[11] 4,308,816

[45] Jan. 5, 1982

[54] AMPHIBIOUS INDUSTRIAL LANDING STAGES WHICH CAN BE RUN AGROUND AND MEANS FOR THE DISPLACEMENT OF HEAVY LOADS TO THE GROUNDS

[76] Inventor: Louis J. Jourdan, 36, rue de Dinan, 35120 Dol de Bretagne, France

[21] Appl. No.: 959,107

[22] Filed: Nov. 9, 1978

[30] Foreign Application Priority Data

Nov. 16, 1977 [FR] France .............................. 77 34967

[51] Int. Cl.³ .............................................. B60F 3/00
[52] U.S. Cl. .................................. 114/270; 180/8 C; 440/36
[58] Field of Search ............... 405/203, 205, 209, 208, 405/218; 114/248, 270; 280/218, 219, 1.181; 180/8 C, 8 R, 7 R; 403/154, 316, 318; 248/317; 294/86.24, 86.25; 440/36

[56] References Cited

U.S. PATENT DOCUMENTS 1,222,997 4/1917 Rottmer .......................... 403/154 X
3,114,425 12/1963 Adams ................................. 180/8 C
3,345,970 10/1967 De Long ............................. 114/248

FOREIGN PATENT DOCUMENTS 1433830 4/1976 United Kingdom ............... 180/8 C

Primary Examiner—Sherman D. Basinger
Attorney, Agent, or Firm—Laff, Whitesel, Conte & Saret

[57] ABSTRACT

Amphibious landing stages or heavy loads are moved over the ground on systems of shoes. A landing stage comprises two port and starboard sets of legs fitted with shoes, which are themselves fitted with soles. Jacks are provided, to enable the sliding of a shoe on its sole, when the sole is applied to the ground, and to enable the reverse motion when the sole is raised. Other jacks either raise the legs or lower them. The legs are lodged inside lockers or wells by a simple locking device which also allows them to be removed. The stage is usable for temporary industrial installations, for wharves or jetties, serving for the displacement of very heavy loads.

10 Claims, 14 Drawing Figures

AMPHIBIOUS INDUSTRIAL LANDING STAGES WHICH CAN BE RUN AGROUND AND MEANS FOR THE DISPLACEMENT OF HEAVY LOADS TO THE GROUNDS

The present invention relates to amphibious landing stages capable of running aground, as well as to means for displacement of heavy loads on the ground.

The interest in industrial landing stages rests in the fact that each landing stage constitutes a construction unit in which the machines are set in fixed stations and, therefore, can directly be used. In fact, the unit can easily be moved to its point of use or close to it, by either a river or seaway. Until now, however, landing stages were used while being kept in the water. This implies all of the contingencies required by ships which are tied to piers, such as precautions to be taken in case of storms, in case of variations of the water level resulting from either flood or tides, etc.

It is, therefore, useful to provide industrial landing stages capable of running aground, for which the above-indicated contingencies do not apply.

One object of the present invention specifically consists of providing for amphibious landing stages.

There are, of course, already known amphibious vehicles capable of running on wheels when on ground. When dealing with industrial landing stages, however, as each one of them represents an important mass, it becomes very difficult to anticipate the number of wheels which will be required to avoid the danger of local cave-ins of the ground under the weight of the landing stage and, therefore, to avoid the danger of accidents. Moreover, in the case of wheel-type systems, unless sophisticated suspension devices are provided, it is necessary to prepare practically flat rolling surfaces.

One further object of the present invention provides devices of the shoe type, which prevent the above-mentioned drawbacks.

Still another object of the present invention provides devices of the movable shoe type, which remain immobilized only during the time necessary for transfer of the amphibious landing stages, in order to increase their utility.

According to a characteristic of the invention, there are planned landing stages fitted with movable vertical legs, capable of going up or down in vertical lockers or the landing stage hull, each leg having at its lower end a shoe capable of sliding over a sole associated with it, with the help of a double action jack. The displacement of the landing stage on dry ground is obtained by lifting the landing stage above the ground through a lowering of its legs, then by causing the shoes to slide on the soles associated with them. The jacks are operated in one direction so as to displace the entire landing stage-leg complex relative to the sole resting on the ground. Then, the landing stage is lowered relative to the legs, to deposit it on the ground, and finally the soles are displaced relative to their shoes through an operation of the jacks in the opposite direction.

According to another characteristic, the legs comprise at their upper ends locking means to lock each leg in its locker. The locking means are automatically shifted to their locking position when the leg is pushed from the bottom up into a locker and when the locking means reach a circular groove cut into the locker wall.

According to another characteristic of the invention, the locking means may be unlocked by an external control to remove the legs from the top of their locker, once the shoes have been disengaged from the legs.

The above-mentioned characteristic, as well as others of the invention, will be more clearly seen upon reading the examples given below, said description being given relative to the attached drawing in which.

Figure 1:
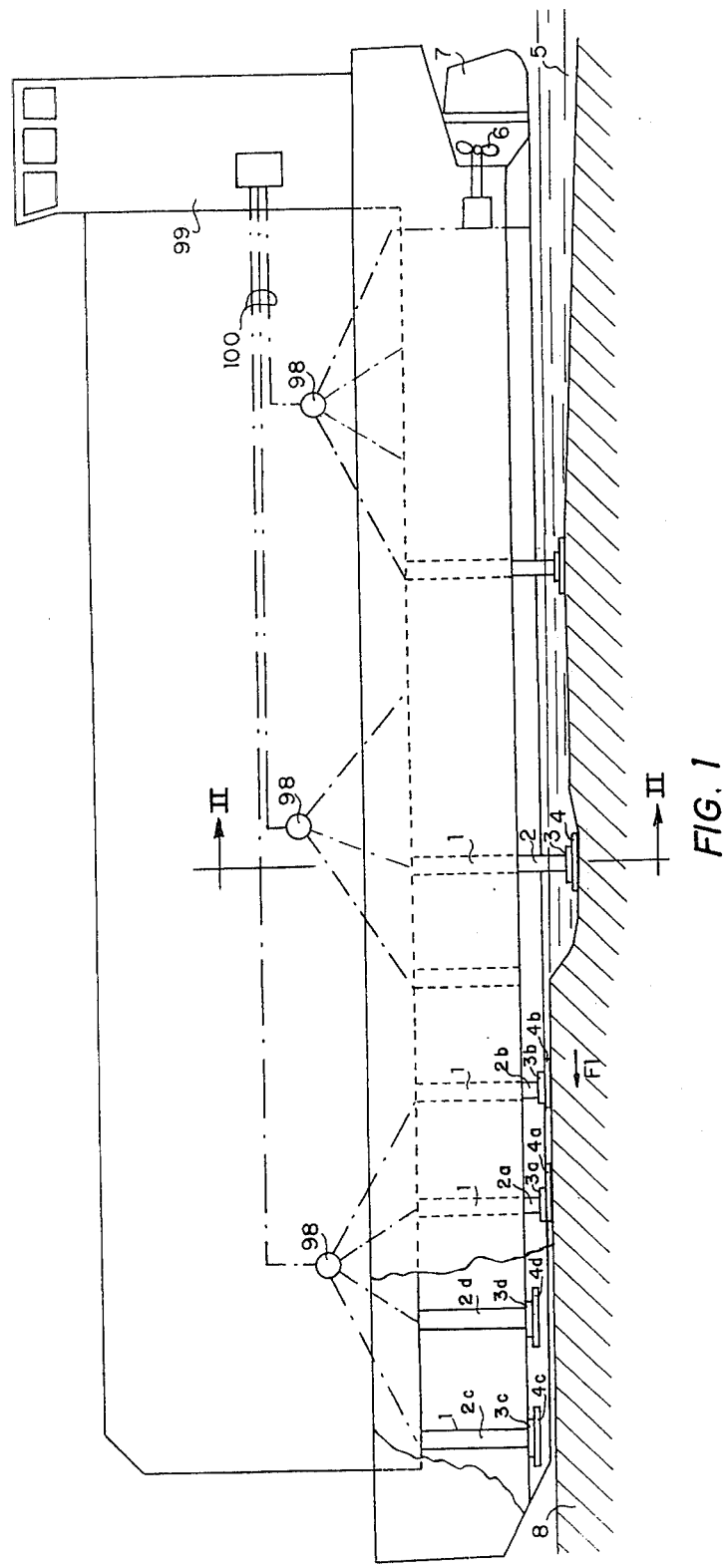
FIG. 1 is a schematic side view of a landing stage fitted with legs according to the present invention.

The landing stage in FIG. 1 is a hull fitted with at least two lateral rows of vertical lockers 1, each one of them containing a leg 2. Each leg 2 is fitted at its lower end with a shoe 3 which supports sole 4, respectively, to which it can be subjected to sliding motions. Each leg 2 can move up or down in the locker 1 associated with it.

When all of the legs are at their uppermost position in their lockers, as represented in the rear of the landing stage, the landing stage can float over water 5. It can be moved either by its own driving means such as propeller 6 associated with rudder 7, or by an external tugging means, as long as there is enough water to float it.

When there is not enough water, or even when there is no water at all, the legs 2 fitted with their shoes 3 and their soles 4 still enable a displacement of the landing stage. Indeed, it is possible to lower the legs so as to slightly raise the whole landing stage complex, as schematically represented by the lowered legs 2a and 2b. By suitable means, shoes 3a and 3b are forced to slide over their respective soles 4a and 4b, in the direction indicated by arrow F1. Then, the legs are raised relative to the landing stage, thus causing the landing stage to move downwardly until it rests on the bottom of its hull which, preferably, is flat. The legs are raised until their soles 4 are no longer in contact with the ground 8, as schematically represented represented by legs 2c and 2d. With suitable means, soles 4c and 4d are forced to slide under their respective shoes 3c and 3d, still in the direction of arrow F1. Then, the legs are lowered to raise the landing stage, and so forth and so on. It is then understood that it is possible to cause the landing stage to move forward, at each operation, by the relative shoe-sole trajectory. This operation may be rather rapidly repeated. Soles 4, together, have a total surface which is sufficient not to sink into the ground, even when same is loose, under the weight of the landing stage.

Figure 2:
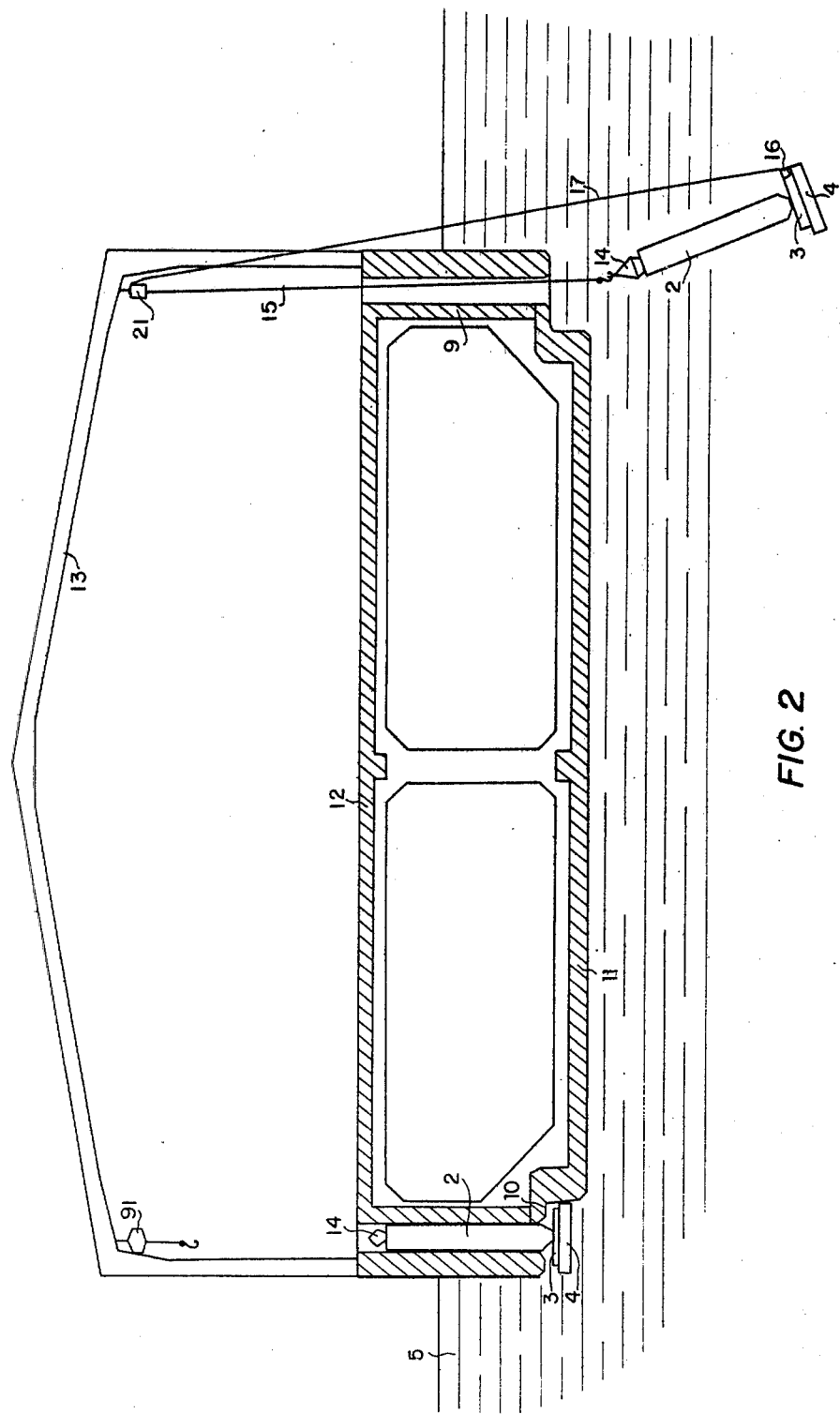
FIG. 2 is a schematic section view of the landing stage in FIG. 1, along line II—II, to illustrate the setting of the legs into place.

As shown by the section in FIG. 2, the hull has a flat bottom. The two lateral edges of the bottom, at its junction with the vertical walls 9, do not project dihedron. Rather, there is a reentrant in the horizontal part 10 into which lockers 1 open. The width of part 10 is slightly greater than that of sole 4 of the shoe of a leg 2, and its height above the lowest part of the landing stage, in this case the lower face of bottom 11 is slightly greater than the height of a sole 4 plus the height of a shoe 3, so that when the leg is raised ino its locker, sole 4 can be completely above and free from the ground.

Lockers 1 open at the top above the water level 5 when the landing stage is floating. In practice, the hull of the landing stage may be of reinforced concrete which has been vibrated when poured. Transverse and longitudinal concrete partitions form compartments which may serve as holds or reservoirs between bottom 11 and bridge 12. Bridge 12 may carry a superstructure of metallic framework 13, inside which can be lodged machines containing, for example, pulleys or movable cranes or lifting engines such as 91, along rows of lockers 1.

Each leg 2 is fitted at its upper end by means of locking device 14 to which a lifting cable 15 can be hooked. At the other end of leg 2, shoe 3 comprises hooking means 16 to which a launching cable 17 is affixed. Cables 15 and 17 are operated in a coordinated manner using lifting engines 91.

FIG. 2 shows how it is possible in the open sea to place a leg 2 into a locker 1. Cable 15 is lowered into locker 1 and its end is caught along the edge and lifted back to the bridge 12. At the end of cable 15, there are hooking means 16 for shoe 3. Thus held at both of its ends, leg 1 is thrown into the water, from aboveboard. Once it has reached a sufficient depth below the hull bottom 11, cable 15 is lifted back into locker 1, thus placing leg 2 into the position indicated in FIG. 1. The top of leg 2 is directed toward the lower opening of locker 1; then, it is lifted inside same. When locking means 14 have reached their locking position, they are operated, and the head of leg 2 is secured to a given point on the wall of locker 1.

It can be seen from the preceding that it is possible to cause the landing stage to navigate without legs 2, thus presenting numerous advantages. First of all, legs 2 and, especially, their shoes 3 and soles 4 are not subjected to the corrosive action of sea water, or of fresh water, during sea or river displacements of the landing stage. Then, the shoes and soles present no rough discontinuities on the hull, thus permitting higher speed without too great an expenditure of energy. Finally, during the travelling periods of the landing stages, as well as during their periods on the ground, the set of legs can be switched to a use on other landing stages. Now, as will be seen below, legs 2 are relatively complex, thus causing them to be expensive. Therefore, it will be appropriate to limit as much as possible the periods during which they are not in use.

There is also the possibility of removing legs 2 from their lockers while in the open sea. To that end, before the landing stage is launched, a cable 17 is hooked to the connecting means 16 of the shoe and the cable is left to hang along the edge. It is then sufficient, at the time of the operation, to unlock means 14, after a cable 15 has been hooked to them, then to let leg 2 go down into the water and, finally, to recover the leg by reeling in cable 17.

Figure 3:
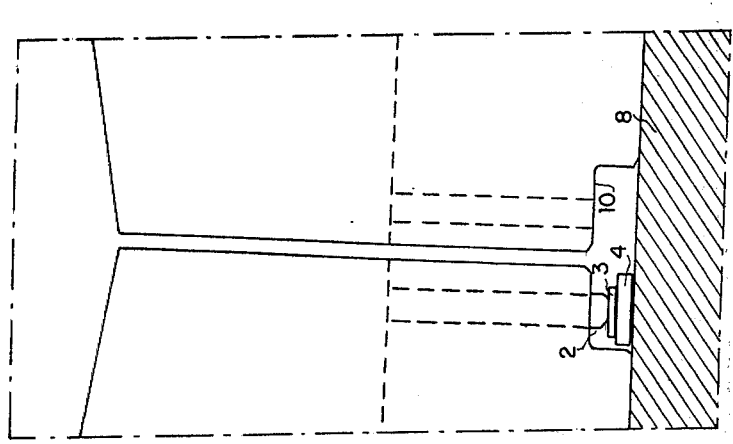
FIG. 3 is a partial schematic section view of the landing stage in FIG. 2 to illustrate the disassembling of the shoes.
Figures 7, 8:
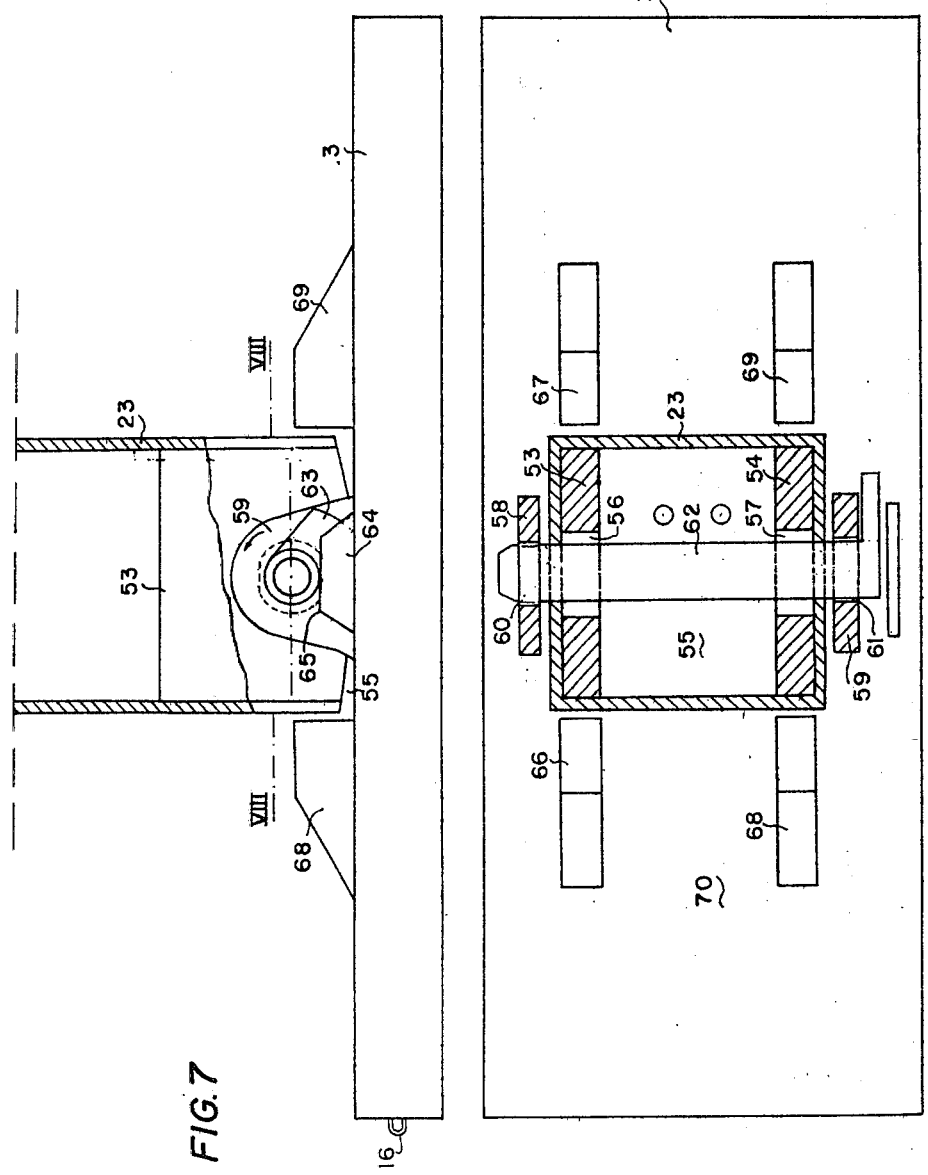
FIG. 7 is a side view of the coupling device between the leg and the shoe associated with it.
FIG. 8 is a top view of the coupling device shown in FIG. 7.

In addition, shoe 3 is mounted at the end of each leg body in a movable manner, the coupling means between shoe 3 and the leg being represented in FIGS. 7 and 8. As shown in FIG. 3, when two landing stages are placed side by side on the ground, once legs 2 have been removed from one of the landing stages, there remains a sufficient space under rim 10 to permit access of the coupling means on the leg shoes of the other landing stage. Once the shoes are disengaged, the leg bodies are recovered by means of the cable 15. After coupling means 14 have been unlocked, the leg bodies are brought back up through the upper openings of lockers 1. It can, therefore, be seen that the legs are used only during the displacements of the landing stages, and that they do not remain uselessly immobilized on the bottom of the stages.

Figure 4:
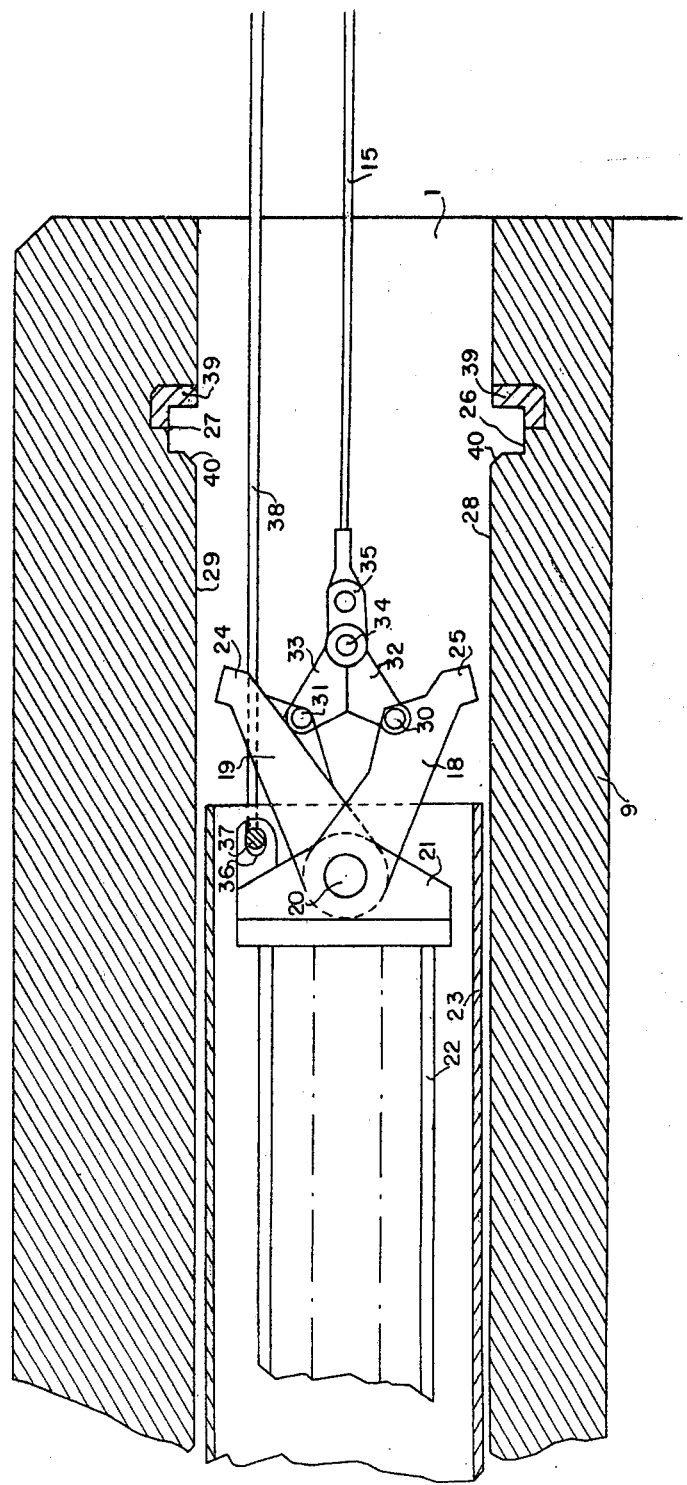
FIG. 4 is a partial longitudinal section view of the higher part of a landing stage locker and of the upper part of a leg during its upward motion into said locker.

FIG. 4 shows locking means 14 in the unlocked position, during the lifting of a leg 2 into a locker 1, for example. Locking means 14 comprise two arms 18 and 19, articulated around a common shaft 20 affixed to the base 21 of a jack cylinder 22 placed inside a square section body 23 of a leg. Each arm 18 or 19 has a free end, respectively 24 or 25, the shape of which is suitable to place itself in notches 26 and 27, respectively provided in the opposite walls 28 and 29 of a square section locker 1. Each arm 18 or 19 carries a horizontal shaft 30 or 31, respectively, around which there is articulated an arm 32 or 33, respectively. Arms 32 and 33 have those of their ends which are opposite shafts 30 and 31 mounted to pivot on a shaft 34 which is supported by a hook 35 attached to one end of cable 15.

In the unlocked position, the locking complex or means formed by arms 18, 19 and 32, 33 is subjected to the weight of the entire leg, that is to say a vertical gravity force (shown horizontally as FIG. 4 is oriented) having its origin on shaft 20, and to the reaction of cable 15. That is to say, a force acts upwardly on the cable which is of the same magnitude as the gravity, vertical, but directed upward, having its origin on shaft 34. The quadrilateral pattern formed by shafts 20, 34, 30 and 31 is then more closed than represented in FIG. 4 in which arms 18, 19, 32 and 33 have been opened for the convenience of illustration. The whole complex of means 14 obviously is symmetrical, relative to a vertical line which is the vertical axis of leg symmetry.

Figure 5:
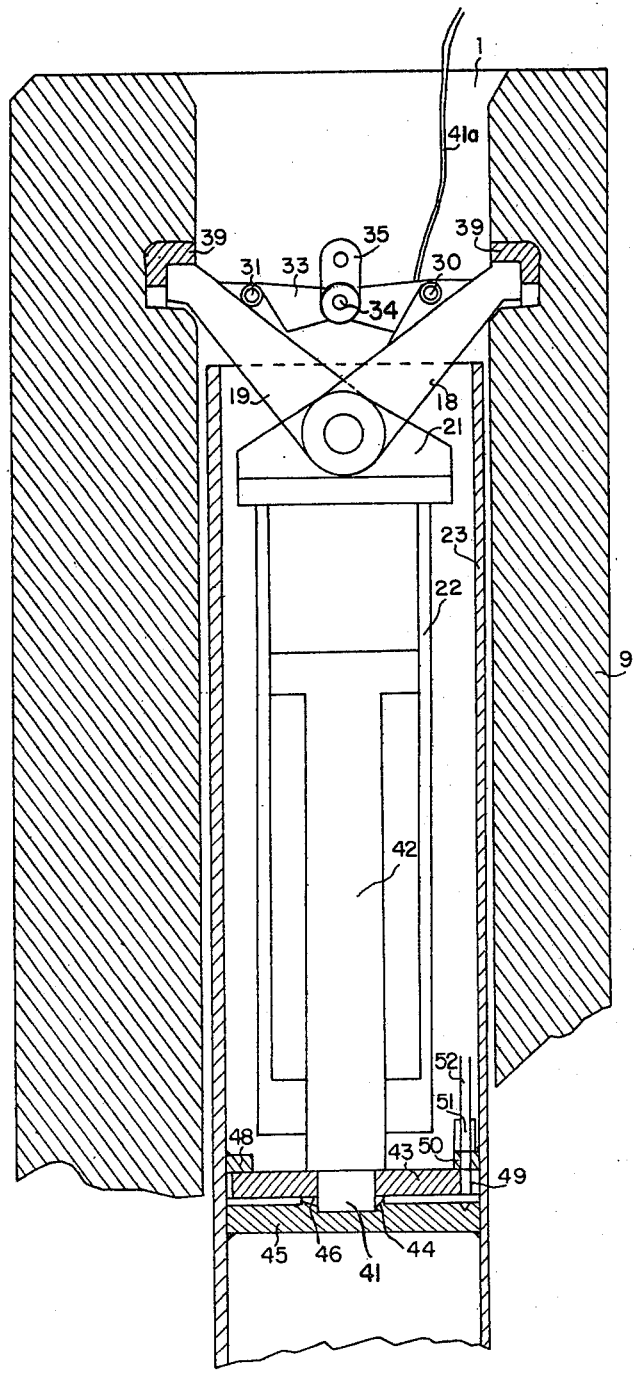
FIG. 5 is the same locker view as in FIG. 4, but showing the means for locking the legs in a locked position, as well as the jack-type device used to lower or raise the shoe.

In locked position, FIG. 5, arms 18 and 19 form an upwardly widely open angle and they have their respective ends 24 and 25 wedged into grooves or notches 26 and 27. In that position, when sole 4 of the leg rests on the ground and when the weight or at least part of the weight of the landing stage rests on ends 24 and 25 by the intermediary of the upper faces of notches 26 and 27, the position of arms 18 and 19 tends to become more set. Moreover, in that position, shaft 34 moves down, under the action of the weight of arms 32 and 33 themselves, to be somewhat slightly below the horizontal line defined by shafts 30 and 31. Arms 32 and 33 form an upwardly widely open angle, the sides of that angle being slanted approximately 6°, for example, relative to the horizontal position. Under those conditions, when the sole of the leg is raised above ground, as seen above, for the purpose of moving the sole relative to the position of the shoe prior to a new step, it is grooves or notches 26 and 27 which hold the leg back in locker 1. Indeed, arms 18 and 19 now have a tendency to close, but they are prevented from doing so by arms 32 and 33 which brace themselves in an open position against shafts 30, 31. Consequently, complex 14 maintains the same shape, thus ensuring the suspension of leg 1 in its locker 1. In locked position, it is possible to detach the end of cable 15 from loop 35 and use it to operate another leg.

Near its upper edge, body 23 of the leg presents an opening 36 through which it is possible to run, inside body 23, the end 37 of a hook extended by a rod 38 hanging from the end of a cable not represented. When it is desired, after leg 2 has been sufficiently raised in locker 1, to cause means 14 to change from the unlocked position of FIG. 4 to the locked position of FIG. 5, rod 38 is manipulated through the upper opening of locker 1, to hook end 37 in opening 36. Then, the cable which supports rod 38 is made taut in order to support the leg and no longer to require cable 15. Under the action of their weight, arms 18 and 19 open. Then, rod 38 is vertically moved to cause ends 24 and 25 to engage in notches 26 and 27, so that arms 32 and 33 will assume the position described with respect to FIG. 5. Locking is then completed, and rod 38 can be removed and cable 15 untied. To change from the locked position to the unlocked position, rod 38 with its hook 37 are replaced inside 36, to hold the leg in place. Then, the end of cable 15 is tied to loop 35 and pulled taut to cause shaft 34 to come back up above the line of shafts 30 and 31. By releasing rod 38, the leg is permitted to move downwardly, thus causing ends 24 and 25 to come out of notches 26 and 27. Here again is the situation represented in FIG. 4, which makes it possible either to let the leg run down into the water, or to pull it out from the top after the shoe 3 has first been disengaged.

In practice, notches 26 and 27 may be formed by a cast steel or iron ring 39, set into place during the pouring of the concrete forming the walls of locker 1. The cross section of 39 may be a reversed L or, even better, a U which opens toward the locker, so that, when ends 24 and 25 are either set into place or removed, chamfers 40 will not be damaged. Ends 24 and 25 have a rectangular profile on three of their sides, corresponding to the three internal faces of the L- or U-shaped cross section, in order to fit, with the necessary play, into the abutting shape of the L- or U-shaped cross section. It must be noted that, as body 23 of the leg and the locker have a square section, it is possible to hook the leg into the locker along two perpendicular directions. It must be further noted that the cross sections of the sections of body 23 and of locker 1 are practically equal, with the play necessary for the introduction of leg 2 into locker 1, or for its removal therefrom. When the leg helps to support the landing stage, it cannot assume an oblique position within its locker.

A jack piston 42 slides inside jack cylinder 22, under the action of either the weight supported by cylinder 22, or the hydraulic pressure of a fluid let into said cylinder by schematically represented pipe 41a. The free end of pipe 41 runs through a coupling plate 43 to lodge inside a hollow part or depression 44 of a supporting plate 45 which is horizontally welded, at its sides, to the internal vertical beam or walls of body 23. Around the end of piston 42, between plate 43 and plate 45, there is a washer 46 serving as a lug piece.

Figure 6:
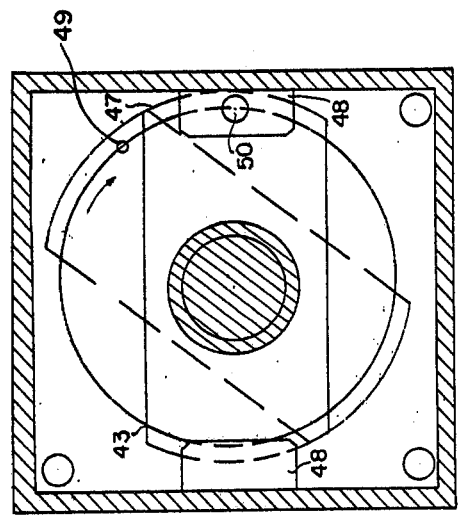
FIG. 6 is a top view of a detail of the coupling of the jack-type device with the leg.

As seen in FIG. 6, coupling plate 43 presents a generally rather elongated rectangular shape with, for example, small sides 47 which are slightly convex. When plate 43 is in its locked position, sides 47 lodge themselves under stops 48, which are formed of small plates welded to the corresponding faces of body 23. The distance between the plane of small plates 48 and plate 45 (FIG. 5) is such that plate 43 can fit between them, somewhat pressing against washer 46. To couple plate 43 with body 23, the whole complex 22-42 of the jack is lowered inside the body until end 41 enters cavity 44, plate 43 being turned with respect to the locking position as indicated by the dash line (FIG. 6), so as to go down between small plates 48, then by pushing on the jack, plate 43 is made to rotate in order to pass it under small plates 48 until a hole 49 in plate 43 comes to line up with a hole 50 in one of the small plates 48. Then, a pin 51 (FIG. 5), constituted by the end of a rod 52, can be maneuvered from the outside of body 23, thus ensuring the junction between 43—that is to say, jack unit 22—42, and means 14—with body 23 of leg 2.

By maneuvering jack 22-42 through a variation of the hydraulic pressure applied through the fluid in duct 41a, it is possible to cause plate 45 to move up or down, respective to cylinder 22—that is to say, to displace body 23 inside its locker 1. The base 21 of cylinder 22 is fixed relative to the locker.

FIG. 7 is a vertical partial section view of the connection between the bottom of body 23 of a leg 2 and a shoe 3, of which only the upper part can be seen. FIG. 8 is a view from the top of the connection, with a horizontal cross section of body 23, taken along line VIII—VIII in FIG. 7.

The lower end of vertical beam or body 23 which, as seen relative to FIGS. 4 to 6, is a hollow metal beam having a square section, is obtained by cutting the beam to form a dihedron with a horizontal edge. The half-planes of the dihedron are symmetrically slanted relative to the horizontal, to form a maximum angle of approximately 7°. In their middle, the edge is perpendicular to the sides of the body, in the direction which is parallel to the direction of displacement of the landing stage. As shown in FIG. 8, the base of body 23 thus created is reinforced by pieces (plates) of sheet metal 53 and 54, welded to the faces of 23 which are parallel to the direction of displacement, and abut at the bottom to form the same dihedron. It must be noted that the lower edges of body 23 and of plates 53 and 54 rest directly on the upper face 55 of shoe 3, when said shoe supports leg 2. Plates 53 and 54, as well as the adjacent faces of body 23 are pierced with two lined-up openings 56 and 57. In addition, on face 55 of shoe 3, on each side of perforations 56 and 57, there are two thick vertical tabs 58 and 59, respectively pierced with holes 60 and 61. Successively through perforations 60, 56, 57 and 61, there can be run a pin 62 formed, for example, of a thick wall duct, which solidifies shoe 3 and leg 2. The diameters of openings 56 and 57 are definitely larger than the diameter of pin 62 so that, when the weight of the leg is applied to the support-forming shoe, the pin is not subjected to any stress, the stresses being applied to the contact surfaces between face 55 and the base of body 23, as stated above. On the other hand, when body 23 of leg 2 is raised in locker 1, by means of jack 22-42, shoe 3 and its sole 4 are in a hanging position. Then, pin 62 lifts both the shoe and the sole. The diameters of borings 60 and 61 are equal, with the necessary play, to that of pin 62. One end of pin 62 is fitted with a small plate 63 welded to it, and the plane of which is perpendicular to the axis of 62. Small plate 63 (which constitutes a handle with an over-center throw) is completely on one side of pin 62, relative to the axis of the latter, so as to maintain, through its weight, the angular position given to it once the pin has been pushed into holes 60,61. On the face 55 of shoe 3, beyond the over-center throw provided by small handle plate 63 relative to tab 58, a vertical tab 64 is provided which is approximately lined up with pin 62, but with its upper edge 64 located below the axis of pin 62. In this way, when small plate 63 is turned upwardly, it is possible to push pin 62, as indicated, above edge 65. Then, to block any removal of pin 62, the small plate 63 is allowed to fall back with the over-center throw of the handle falling while rotating, between plates 59 and 64, this ensuring the horizontal locking of pin 62.

On each side of body 23, in line with reinforcing plates 58 and 59, respectively, small height plates 66 and 69 are provided on the face 55 of shoe 3, which small plates serve as lug pieces to limit the relative translation motions between body 23 and shoe 3, despite the plays between pin 62 and bearings 58 and 59.

Figure 9:
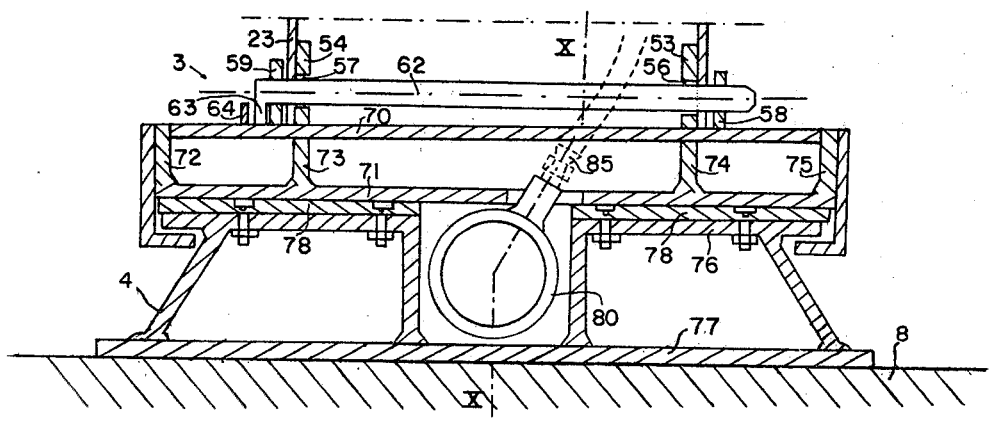
FIG. 9 is a longitudinal section view of a leg shoe associated with a sole.
Figure 10:
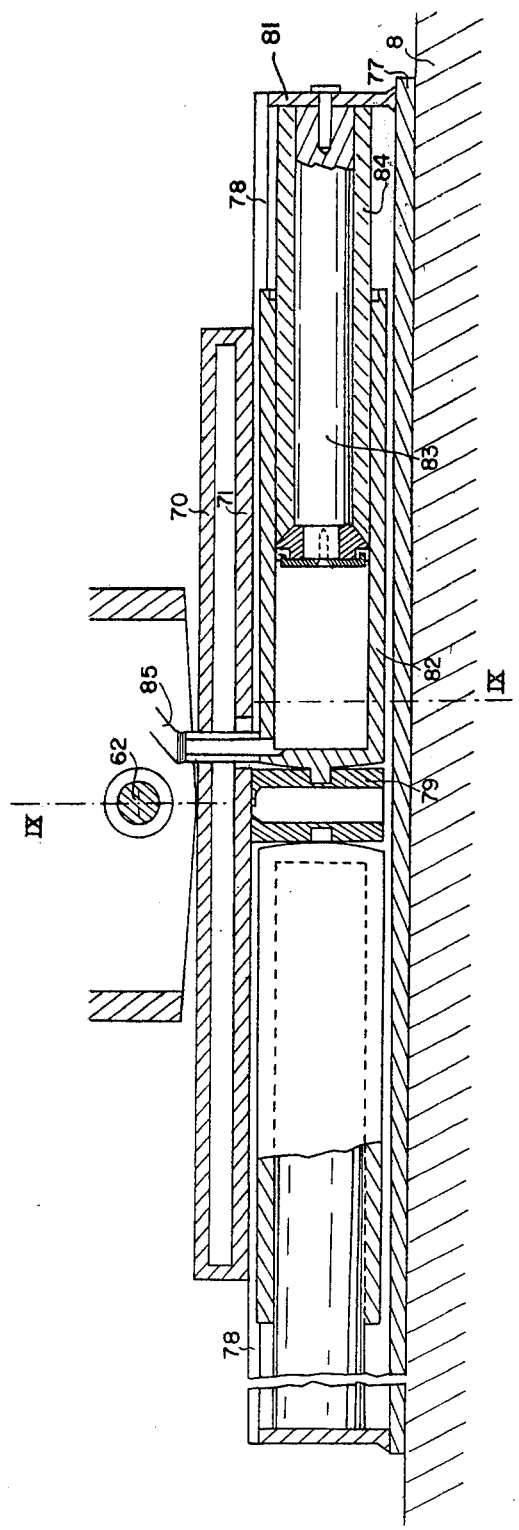
FIG. 10 is a cross-sectional view of the shoe and of the sole represented in FIG. 1.

FIGS. 9 and 10 represent the assembly of sole 4 and shoe 3. Shoe 3 is constituted by an upper plate 70 and a lower plate 71 joined by cross-pieces 72 to 75 which are vertical, pieces 72 and 75 forming the lateral faces and pieces 73 and 74 (FIG. 9) being perpendicular to reinforcing plates 58 and 59. Sole 4 is longer than shoe 3. It is constituted, as is shoe 3, by a welded assembly of steel plates and of flatirons, among which there are an upper plate 76 and a lower plate 77, which rest on the ground. The upper surface or face of plate 76 is fitted with a plate 78 made of anti-friction synthetic material. In the middle of the lower plate 71 of the shoe, there is welded a downwardly directed lug piece 79, constituted by a narrow and short U-shaped iron, or by two small plates transversely placed relative to the forward direction of motion. Lug piece 79 engages in a groove 80 extending in the direction of the longitudinal axis of sole 4. Groove 80 is closed at each one of its ends by a plate 81 (FIG. 10).

It must be noted that the section view in FIG. 9 is taken along line IX—IX in FIG. 10, while the section view in FIG. 10 is done along line X—X in FIG. 9, and that on the left side of FIG. 10, sole 4 is represented in partial section view.

Two simple action jacks are coaxially placed inside groove 80 on each side of lug piece 79. Each jack is formed by a cylinder 82 having its back positioned against lug piece 79, and a steel rod 83 affixed, at its end, to corresponding plate 81 and surrounded with a replaceable sleeve 84 made of synthetic anti-friction material.

Each jack 82–83 is fed, near lug piece 79, by a flexible duct 85 running through a delivery opening in base 71 of shoe 3, and through another delivery opening of plate 70 to the inside leg body 23.

It is obvious that by alternately feeding one jack 82–83 and then the other jacks 82–83, the relative sliding of sole 4 under shoe 3 is obtained alternately rearward and forward. Of course, jacks 82–83, as well as 22–42 (FIGS. 4, 5), are subjected to the action of sea water. Therefore, each jack is of the "marine" type: cylinders and piston rods of stainless steel, replaceable plastic sleeves, as already stated, bronze parts replaced with industrial plastic parts, to prevent any electrolysis effect with the neighboring steel parts.

In the same manner, the connections of the flexible ducts shall be made of stainless steel.

It will be recalled, as already described relative to FIG. 1, that the forward motion of the landing stage is done in repeated cycles. Each cycle comprises the following maneuvers:
 1. lifting the landing stage on its legs 2;
 2. sliding shoes 3 over soles 4 which are resting firmly on the ground;
 3. resting the landing stage on the bottom of its hull; and
 4. raising the shoes 3 and sliding soles 4 forwardly, under the raised shoes 3.

It must be noted that the forward motion of soles 4 requires, for the corresponding jack, an effort which is appreciably less important than one necessary for the displacement of the landing stage on its soles. Therefore, it is possible to plan for one of the jacks 82–83 to be less powerful or to be operated with compressed air instead of hydraulic fluid under pressure.

The plastic material of plate 78 may, for example, be Teflon, known under its mark "ERTAFLUOR," which has an excellent sliding coefficient of friction.

Figure 12:
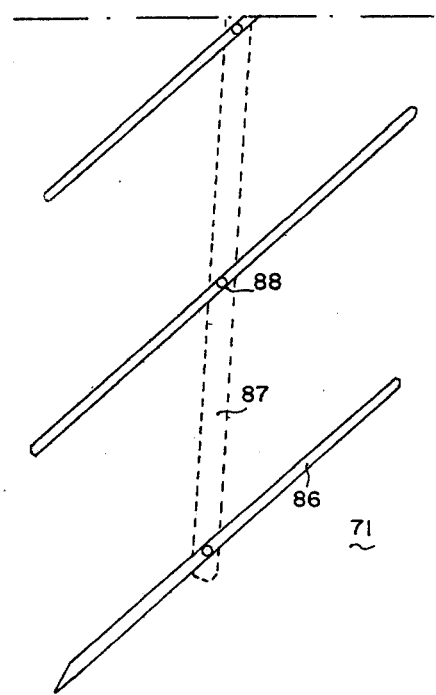
FIG. 12 is a partial view, from below, of the face of the shoe which is in contact with the upper face of the sole.
Figure 11:
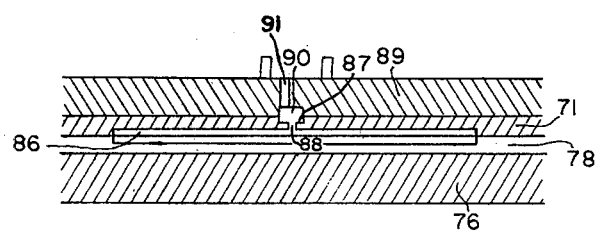
FIG. 11 is a cross section, in larger scale, of the interface between shoe and sole in FIG. 9, along line IX—IX in FIG. 10.

FIG. 11 is a section of the interface between lower plate 71 of the shoe and the sliding plate 78 affixed to the sole, in a scale which is larger than the scale of FIGS. 9 and 10. The device of FIG. 11 further makes it possible to improve the quality of the sliding between those plates by providing a cushion of pressurized water between them. FIG. 12 shows the lower plate 71, seen from the bottom, which plate presents ramified networks of grooves 86 cut in surface 71. Each network of grooves 86 is supplied from a feeding groove 87 cut on the other side of plate 71, relative to grooves 86, a small diameter opening 88 being bored through plate 71 or formed at right angles with each intersection of groove 87 with a groove 86. Above the plate 71, a counter-plate 89 is provided to present grooves 90 turned toward plate 71, and which are in a position facing feeding grooves 87. Each groove 90 is connected, through a perforation 91 in plate 89, to a feeding intake opening for the water under pressure. The intake opening is itself connected by means of a suitable duct to a pump set up on the bridge of the landing stage.

The water pumped into groove 90 runs through openings 88 into grooves 86, then spreads itself between plates 71 and 78, creating between the plates a very thin water cushion which definitely improves the friction coefficient. In fact, the water pressure must be applied only during the forward motion of shoes 3 on soles 4.

Figure 13:
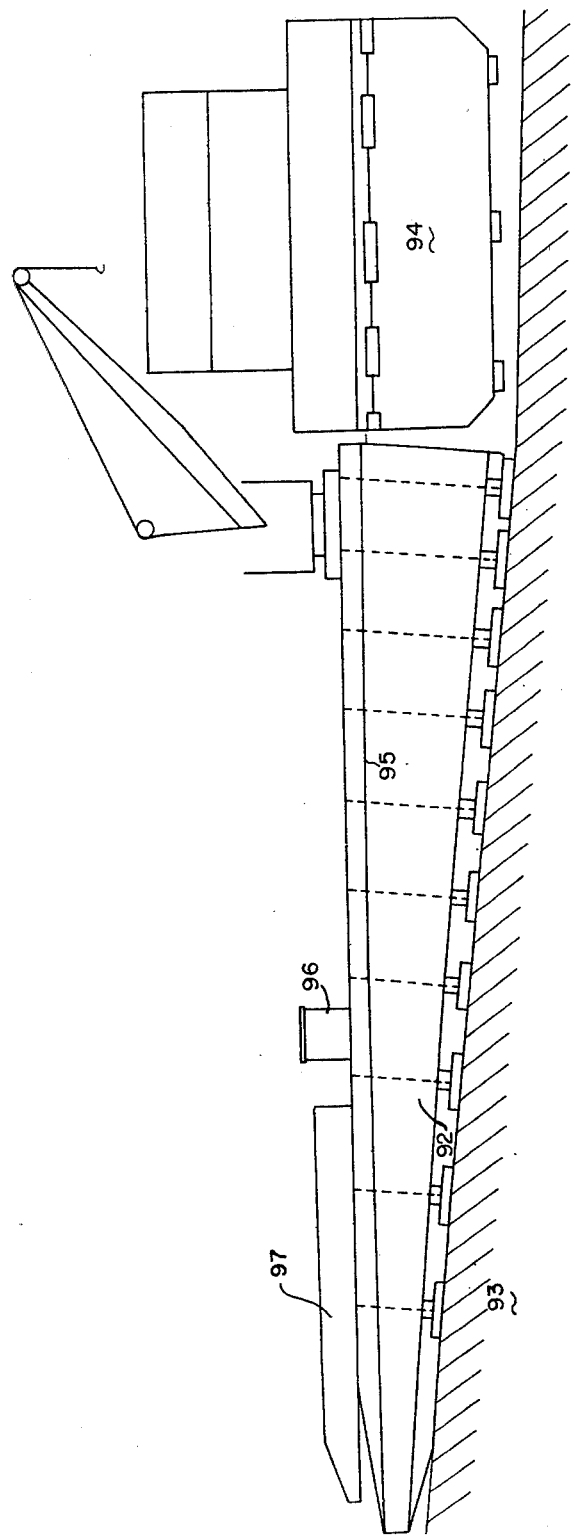
FIG. 13 is a side view of a landing stage which can be run aground, according to the present invention, to serve as a jetty.

FIG. 13 schematically represents a landing stage 92 having, in longitudinal section, an angular shape planned so that it can serve as a jetty on a beach 93. In the example which is represented, it is assumed that the slope of beach 93 forms a 4° angle with respect to a horizontal line. Under those conditions, if the angle of the apex of the landing stage is also 4°, the upper floor of the landing stage is horizontal when the bottom of the landing stage rests on the beach. Landing stage 92, as the landing stage in FIG. 1, is fitted with legs 2 set on shoe-sole complexes 3–4. The axes of the lockers inside which legs 2 are lodged form an angle in the order of 4° with respect to the vertical direction.

It can be understood that, by operating the shoe-sole complexes 3-4, as described with respect to FIGS. 1 to 12, it is possible to cause the landing stage 92 to move up and down on beach 93, as a function of the tide, so that a cargo 94, seen in cross section, can remain afloat whatever may be the level of sea 5.

Figure 14:
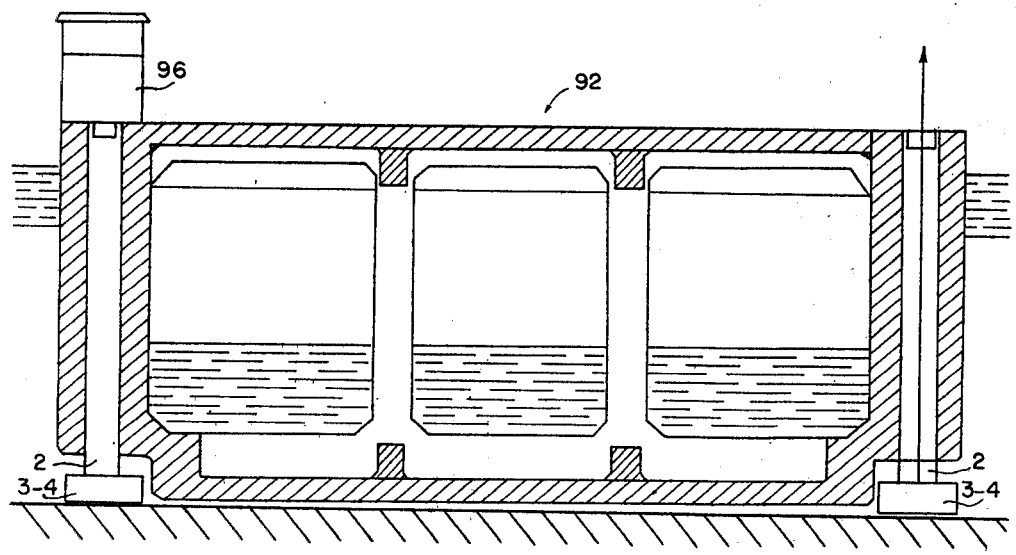
FIG. 14 is a cross-sectional view of the landing stage in FIG. 13.

Landing stage 92 has, with respect to cargo 94, a height sufficient so that ships which may have to cooperate with it will always be afloat when the level of the sea 5 either reaches or goes beyond a line 95 which is traced on a floating stage 92. The floor of landing stage 92 is as free and unencumbered as possible since the control room 96 is located on the side, as seen in FIG. 14. In order to ensure a good adhesion of landing stage 92 on the beach, there are, in the body itself, compartments which can be ballasted with sand and with water, the level of which can be adjusted by means of pumps. The second view in FIG. 14 shows such a structure.

The jetty constituted by landing stage 92 presents appreciable advantages as compared to the floatingly movable landing stages which are commonly used. Indeed, during use, the landing stage is strongly fixed and it is no longer subjected to the motion of the waves; this makes it easier to move vehicles over its floor. In case of storms, typhoons or some other disturbance of the same type, landing stage 92 can move up and be placed in a dry location, thus completely ensuring its safety. At its end which is nearest land, landing stage 92 may be associated with a light gangway 97, which can be drawn back to the bridge for moving the landing stage, as indicated in FIG. 13.

The descending and lifting maneuvers of legs 2 preferably are governed, in the landing stage, as represented in FIG. 1, as well as in the one represented in FIG. 13, by a set of port and starboard hydraulic groups. Each set of legs may include, for example, three or four hydraulic groups 98, FIG. 1, which are governed from the bridge 99 by means of electric cables 100.

In the same manner, the relative movements of the shoes and of their soles are governed by electro-valves which do or do not apply the oil pressure to the suitable jacks, supplied by the groups. It is possible, by working on the various electro-valves which govern the shoes or the legs, in order to execute the various motions indicated below: In order to move forward in a straight line, the port and starboard sets of shoes and legs are operated simultaneously. To turn, as in the case of caterpillar-type vehicles, one of the sets of legs and shoes is operated while the other one remains at rest, with legs raised, for example. It must be noted that the square section of the lockers and of the legs also makes it possible to cause an angular rotation of the legs by 90°. That is to say, by shifting the longitudinal direction in which the shoes and soles move, the stage may then move at right angles to perform a last approaching maneuver, for example.

When the landing stage is stopped on dry ground, it is possible to govern the descending strokes of pistons 42, of jacks 22 and of legs 2, in order to distribute the load or, also, on a poorly levelled ground, to compensate for the local level differences.

It must further be noted that, if one of legs 2 should be out of order, it is very easy to place it in its elevated position by unlocking plate 43 shown in FIG. 6, and by lifting the leg into its locker. The number of legs, of course, must be provided in an excess number, in order to provide for cases when one or more legs are out of order.

It must further be noted that, for the relaunching of a landing stage, it is very easy to replace the legs while they are on the ground, by introducing the legs from the top of their lockers 1, and then by coupling them with the shoes and soles.

In the above-described embodiments, no assumption has been made as to the condition of the ground on which the soles are applied. In fact, when the ground has been prepared, it then becomes possible, with the sets of legs such as described, to move not only very heavy landing stages, but also other very heavy loads which are presently moved on rollers and with great difficulty, such as concrete bridges which are set into place from one bank according to a now common technique. Also, the sets of legs make it possible to displace bases of concrete tanks which are to be dropped to the bottom of the sea, near offshore oil wells. It is obvious that, in those cases of use, there must be included in the loads to be transported the lockers 1 necessary to lodge the legs during the displacement of the load. It will be seen, however, that the structure of those wells is very simple and that it does not cause any appreciable increase in the cost of the load. The structure of each leg may be carefully worked out, as one leg can serve several times.

It must further be noted that the sliding coefficient of the adjacent surfaces of the shoes and of the soles, already improved through the use of the injection of water under pressure, as described relative to FIGS. 11 and 12, may further be increased through the use of a mixture of water and a detergent.

It must further be noted that, when the displacement means, one example of which has just been described, are used solely on the ground to move very heavy weights, lockers 1 may be replaced by simple leg hooking means, and that the length of said legs may be shortened.

The locking means represented in FIGS. 4 and 5, and constituted by two pairs of pivoting arms, connected together to form an articulated quadrilateral figure, may then be replaced with simpler hooking devices. Those hooking means must make it possible to ensure the push of the legs when they lift the load. This is possibly executed by means of lug pieces. The locking means must also maintain the hanging legs when the latter are retracted, to cause the soles to move forward.

It must also be understood that, in order to cause the forward motion of a load such as a landing stage, for example, it is not always necessary to let the load rest completely on the ground during the forward motion of the soles, but only to let it rest on the even-numbered legs while the uneven-numbered legs are retracted, then vice versa; another type of grouping than simple parity, of course, may be chosen.

Those who are skilled in the art will readily perceive how to modify the system. Therefore, the appended claims are to be construed to cover all equivalent structures which fall within the true scope and spirit of the invention.

I claim:

1. Transport means for displacement of heavy loads, on the ground, on a beach, and in shallow water, said transport means comprising sets of practically vertical leg means mounted to raise and lower in lockers made in the load to be displaced, the lower end of each leg means resting directly on the top of a shoe means capable of sliding over the surface of an associated sole means, whereby the full weight that is supported by said leg is transferred directly through said shoe to the underlying sole, jack means for controlling the leg means, shoe means, and sole means, the displacement of the load occurring by operating jack means to cause the leg means to move down, thus causing the load to rise, then by operating other jack means for causing the shoe means to slide over the sole means associated with them, said other jack means working in one direction to displace the complex formed by the load and the leg means, relative to the sole means applied to the ground, then by lifting the leg means to set the load down, and then by displacing the sole means while they are raised relative to their shoe means by working the other jack means in the opposite direction, said leg means being movable and comprising, at their upper ends, arm means attached to each leg for engaging a groove within the cross section of its associated locker and thereby locking the leg in position, and means for automatically moving said locking means to their locked position when a leg means is pushed into a locker and when said locking means reach the groove in said cross section of the associated locker.

2. Transport means according to claim 1 and means for unlocking the locking means responsive to an external control in order to move the associated leg means out of its locker.

3. Transport means according to claim 2 wherein each of said lockers is open at both ends, to make it possible to take out or place the leg means in either end, each shoe means being removable to enable passage of the leg means alone through the upper end of the locker.

4. Transport means for displacement of heavy loads, on the ground, on a beach, and in shallow water, said transport means comprising sets of practically vertical leg means mounted to raise and lower in lockers made in the load to be displaced, the lower end of each leg means resting directly on the top of a shoe means capable of sliding over the surface of an associated sole means, whereby the full weight that is supported by said leg is transferred directly through said shoe to the underlying sole, jack means for controlling the leg means, shoe means, and sole means, the displacement of the load occurring by operating jack means to cause the leg means to move down, thus causing the load to rise, then by operating other jack means for causing the shoe means to slide over the sole means associated with them, said other jack means working in one direction to displace the complex formed by the load and the leg means, relative to the sole means applied to the ground, then by lifting the leg means to set the load down, and then by displacing the sole means while they are raised relative to their shoe means by working the other jack means in the opposite direction, said leg means being movable and comprising, at their upper ends, arm means attached to each leg for engaging a groove within the cross section of its associated locker and thereby locking the leg in position, and means for automatically moving said locking means to their locked position when a leg means is pushed into a locker and when said locking means reach the groove in said cross section of the associated locker, means for unlocking the locking means responsive to an external control in order to move the associated leg means out of its locker, said locking means comprises a first set of two lever arms symmetrically pivoting around a first shaft fixed on the top of the leg means, a second set of two lever arms symmetrically pivoting around a second shaft, each of said second arms respectively being pivotally mounted on an arm, said two sets of arms articulating to form a quadrilateral figure, the second arms being appreciably shorter than the first arms, the first and the second arms locking in position in an upward-open angle which is positioned with the ends of the first arms engaged in the groove within the locker, said ends of the first arms supporting the load when the leg means are moved down, and the second arms serving as supports which prevent the first arms from closing when the leg means are lifted and are hanging by said locking means.

5. Transport means according to one of the claims 1 to 4 and connection means between the bottom of a leg means and the associated shoe means, said connection means comprising a pin means extending perpendicularly to the direction in which the shoe means slide, said pin means running successively through holes in vertical tabs welded on the shoe means, the diameter of said holes being approximately the diameter of the pin means, and said pin means further extending through holes formed in walls of the leg means, the diameter of the holes in the walls of the leg means being greater than the diameter of the pin means, so that when the leg means support the load, the bottom of the leg means rests directly on the associated shoe means.

6. Transport means according to claim 5 wherein said pin means have a handle with an off-center throw, the center of gravity of the pin means causing the throw to block any longitudinal motion of said pin means, when in a connected position, whereby the pin means can be easily removed to enable a separation of the shoe means from the leg means.

7. Transport means according to any one of the claims 1 to 4 wherein the leg means comprises a jack means hooked to the locking means and having a summit which forms the summit of the leg means, and a vertical beam connected to said jack means, and coupling means for operating said vertical beam from the top of the locker.

8. Transport means according to any one of the claims 1 to 4, wherein the parts of the shoe means which slide over the sole means are flat parts and means for injecting water under high pressure between said flat parts.

9. Transport means according to claim 8 in which said water injecting means include a network of grooves formed in the flat part of the sole means and in parts bored into the flat part of the shoe means, the grooves forming means for distributing water over the whole surface of the shoe means.

10. Transport means according to one of claims 1 to 4, wherein said jack means are hydraulic jacks and means for controlling the jack means by hydraulic groupings distributed into zones, and means for remotely controlling said hydraulic jacks by electric means, in order to distribute the actions of said jacks to control a walking motion.

* * * * *